R. B. HARTSOUGH.
TRACTOR.
APPLICATION FILED JUNE 21, 1915.

1,348,003.

Patented July 27, 1920.
3 SHEETS—SHEET 3.

WITNESSES
E. C. Skinkle
H. L. Opsahl.

INVENTOR
R. B. Hartsough
BY HIS ATTORNEYS
Williamson Merchant

UNITED STATES PATENT OFFICE.

RALPH B. HARTSOUGH, OF MINNEAPOLIS, MINNESOTA.

TRACTOR.

1,348,003.  Specification of Letters Patent.  Patented July 27, 1920.

Application filed June 21, 1915. Serial No. 35,191.

*To all whom it may concern:*

Be it known that I, RALPH B. HARTSOUGH, a citizen of the United States, residing at Minneapolis, in the county of Hennepin and State of Minnesota, have invented certain new and useful Improvements in Tractors; and I do hereby declare the following to be a full, clear, and exact description of the invention, such as will enable others skilled in the art to which it appertains to make and use the same.

My invention has for its object to provide an extremely simple and highly efficient tractor, and to such ends, generally stated, the invention consists of the novel devices and combinations of devices hereinafter described and defined in the claims.

More particularly, the present invention is directed to the improvement of small size tractors such as will serve to draw from two to four plows and which are also serviceable as a substitute for horses for drawing wagons, threshing rigs, cultivators, and which are, therefore, well adapted for general farm use.

This improved tractor has three wheels, to-wit, two relatively large and heavy rear traction wheels, and a relatively small front guide wheel that is located directly in front of the furrow side traction wheel and is therefore adapted to run in the same furrow therewith. The motor and driving gears are so mounted that they are nearly counter-poised on the journals of the rear or traction wheels, whereby all but a relatively small part of the load is carried on the two rear traction wheels, and hence, is rendered effective to produce traction on the said two traction wheels. The engine is preferably an explosive engine of the horizontally opposed cylinder type and this engine is connected to the two traction wheels through a differential gear, so that driving power is applied to both traction wheels and side draft or back drag on the tractor, such as produced by an offset idle wheel, is eliminated. At the same time, the front guide wheel being located in front of the furrow side traction wheel is arranged to run in a furrow so that it may be used to automatically guide the tractor. Hence it will be understood that this relative arrangement of the positively driven relatively large rear traction wheels carrying the main weight of the tractor, and the relatively small front guide wheel arranged to run in a furrow, are salient features of the present invention and are essential to the desired result obtained. Here it may be further stated that a front guide wheel anywhere near approximating in diameter the diameter of the rear traction wheels, could not possibly be used to guide the tractor in a furrow of the depth made by a plow, because if of such large diameter, it would climb over the wall of the furrow when set to crowd against the same.

The invention also involves other important features which will appear with the following detailed description of the preferred construction of the tractor.

In the accompanying drawings which illustrate the improved tractor in its preferred form, like characters indicate like parts throughout the several views. Referring to the drawings.

Figure 1:
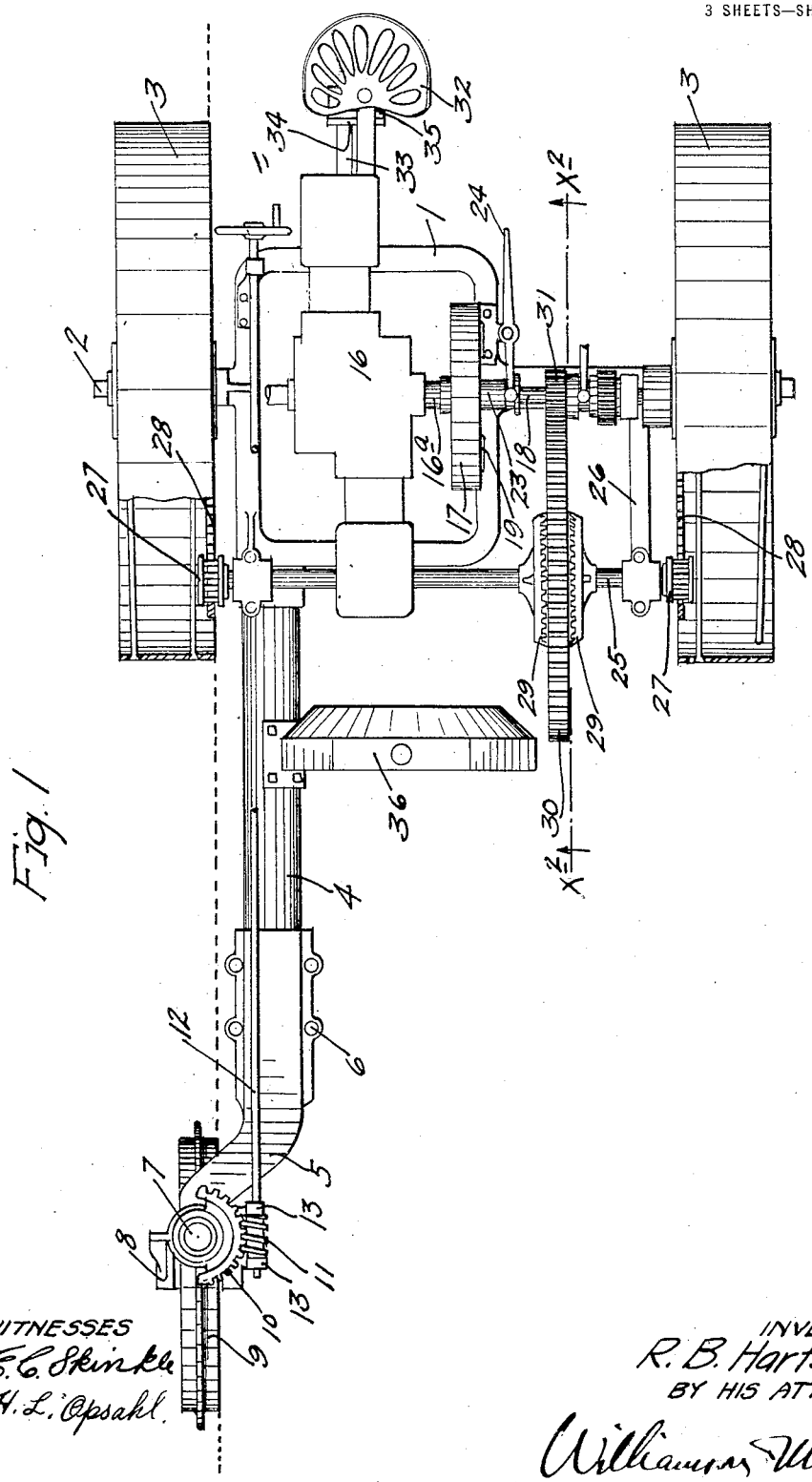
Figure 1 is a plan view of the improved tractor.
Figure 2:
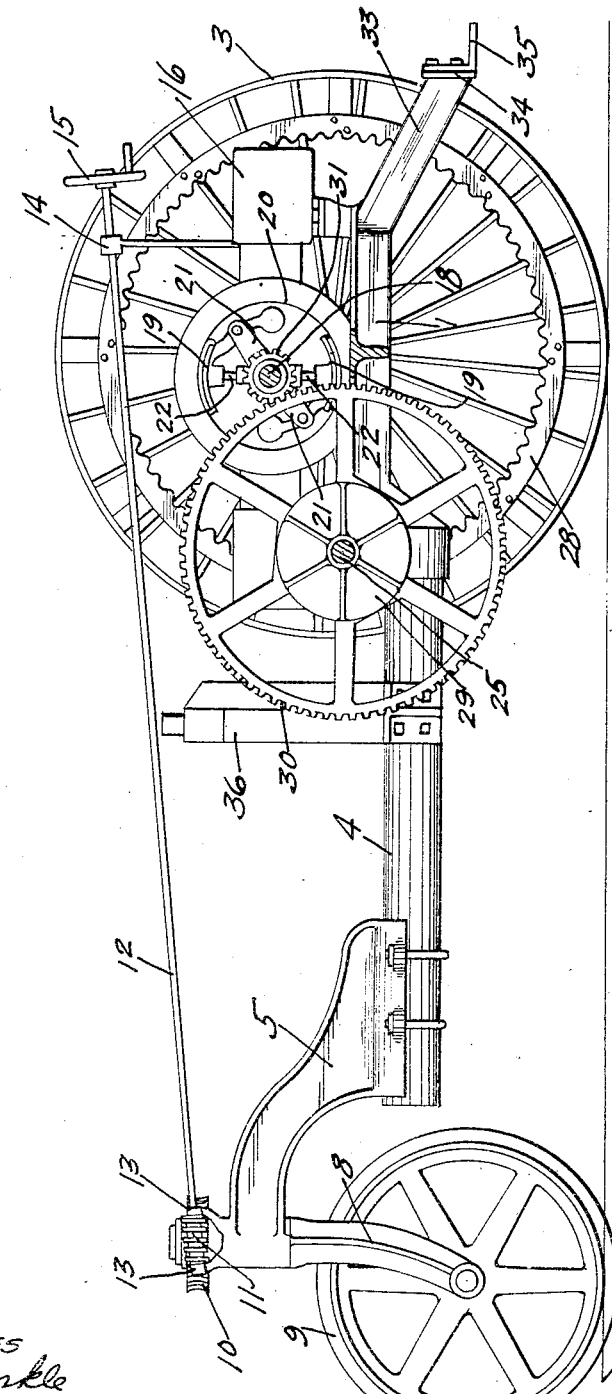
Fig. 2 is a left side elevation of the tractor with some of the parts sectioned on the line $x^2\ x^2$ on Fig. 1.

The frame of the tractor may, of course, take different forms, but as shown, it comprises a rear frame casting 1 having axially alined trunnions 2 on which the large rear traction wheels 3 are journaled. This frame casting 1, at the further side thereof, is provided with a forwardly projecting arm 4 shown as of cylindrical or tubular form. To the front end of this arm 4, a front wheel bearing bracket 5 is rigidly secured, with freedom however, for forward and rearward adjustments, by means of nut-equipped U-bolts 6. To the front end of this bearing bracket 5, the stem 7 of a pronged upright wheel bracket 8, is journaled; and the relatively small front guide wheel 9 is journaled to the prongs of this wheel bracket. To the upper end of the stem 7 of the said wheel bracket, a segmental worm gear 10 is rigidly secured, and this worm gear is engaged by a worm 11 secured to the front end of a worm operating shaft 12. The front end of this worm shaft 12 is journaled in bearing lugs 13 rigidly secured to the front end of the bracket 5 and bracing the ends of the hub of the worm 11 so that the said worm thrusts against the same. The rear end portion of the said worm operating shaft 12 is journaled in the upper end of a bearing post or bracket 14 rigidly secured on the rear portion of the frame casting 1. At its extreme rear end, the said shaft 12 is provided with an operating crank or hand piece 15. Here it will be noted that the shaft 12 is free to slide endwise through the bearing post 14, when the casting 5 is adjusted longitudinally on the arm 4 of the tractor frame. Adjustments of the said casting 5 on the frame arm 4 will carry the front wheel farther from or nearer to the traction wheels and thereby vary to a considerable extent the balance of the machine and also the steering action.

The explosive engine above referred to is indicated as an entirety by the numeral 16, and the cylinders thereof are rigidly secured to the frame casting 1 with the two cylinders arranged with their axes projecting into forwardly and rearwardly direction and with the engine approximately counterbalanced on the journals of the rear traction wheels. The projecting end of the crank shaft 16$^a$ of this engine carries a fly wheel 17, the hub of which is adapted to be connected, at will, to the adjacent end of an axially alined shaft 18, by means of a friction clutch of suitable construction. Said shaft 18 is journaled in suitable bearings on the frame casting 1. As shown, the friction clutch just noted comprises clutch shoes 19 that engage an internal cylindrical surface 20 of the fly-wheel 17. These clutch shoes 19 are pivoted to the projecting ends of diametrically projected arms 21 rigidly secured to a shaft 18 so that when the said shoes are engaged with the said cylindrical surface 20, the shaft 18 will be coupled for rotation with the engine crank shaft. The shoes 19 have inwardly projecting portions 22 that are engaged by the tapered end of a clutch actuating sleeve 23 mounted to slide on the shaft 18 and subject to an operating lever 24 pivoted to the adjacent portion of the frame casting 1.

The numeral 25 indicates a divided countershaft, one section of which is journaled in suitable bearings on the frame casting 1 and the other of which is journaled in a suitable bearing on a forwardly projecting arm 26 of the said frame casting. The two shaft sections 25, at their outer ends, are provided with suitable pinions 27 that engage with larger internal gears 28 rigidly secured in any suitable manner with the respective traction wheels 3. The adjacent ends of the sections of the divided countershaft 25 are connected through an ordinary differential gear, the construction of which is well understood, and of the parts of which it is only desirable to particularly note the opposing beveled gears 29 secured, one to each of the said shaft sections, and the master gear 30 which, through pinions not shown, drives the gears 29 with a differential action. The master gear 30 meshes with a spur pinion 31 carried by the shaft 18. The gear connections described are ample for imparting forward movement to the tractor, but of course, suitable reverse driving mechanism is also provided. However, as the transmission mechanism, *per se*, constitutes no part of the present invention, the details of this reversing mechanism will not be here considered.

The driver's seat 32 is located just at the rear of the engine 16, and is suitably supported from the frame casting 1. Just below this seat 32, the frame casting 1 has a rigid rearwardly projecting draw bar 33 preferably terminating in a flat flanged head 34 to which is bolted or otherwise rigidly secured, a clevis 35, to which a gang plow or the pull or draw connection of any vehicle may be conveniently attached.

The numeral 36 indicates a radiator shown as supported from the forwardly projecting arm 4 of the tractor frame. This radiator may be of any suitable or approved construction and will be connected to the water jacket of the engine through pipes, not shown, and not necessary for the purposes of this case to consider.

Figure 3:
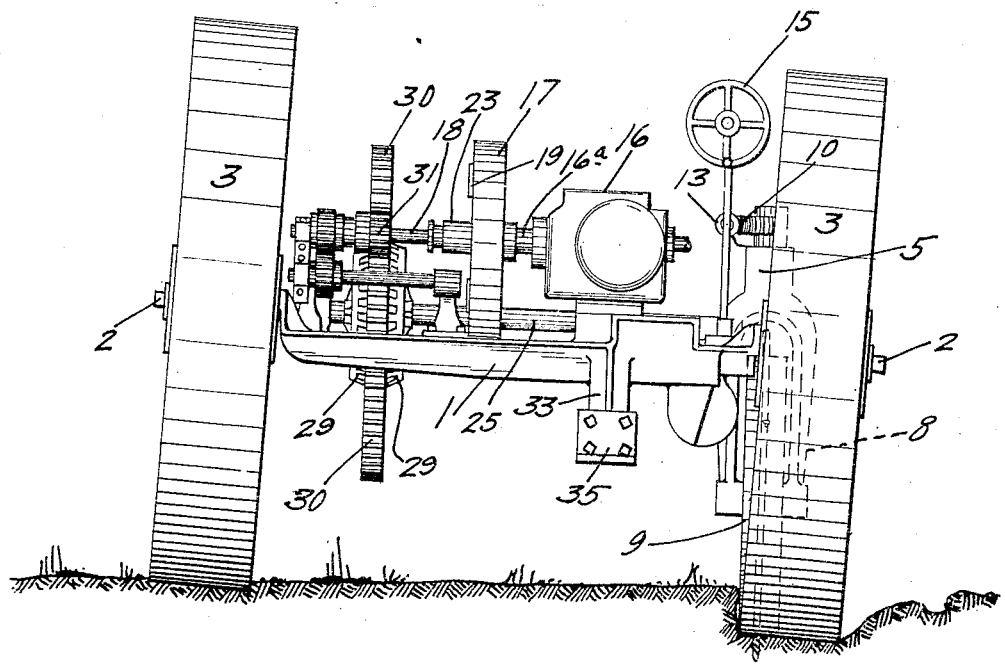
Fig. 3 is a rear elevation of the tractor.

As one of the features contributing to the simplification of the tractor and in the lowest cost thereof, means for raising and lowering one of the traction or rear wheels in respect to the other, has been eliminated. The well known purpose of such raising and lowering devices is to keep the tractor approximately level, both when running on the road or surface of the ground and when one of the traction wheels is running in the furrow. A furrow made by a plow will vary approximately from four to six inches. Obviously, when one traction wheel is running on the surface of the ground and the other in a six inch furrow, for example, the tractor will be tilted considerably. Approximately such tilted position is illustrated in Fig. 3. When the frame of the tractor and the transmission mechanism thereon, including the cross shafts, are tilted to too great an extent, the oil on the journals will tend to drift toward the low side of the tractor, and also the carbureter of the engine will be given a maximum of tilt, which tilt of the carbureter, however, does not materially interfere with its action unless such tilt be extreme.

Obviously, the tractor may be easily started when running on the road or over a field, by the proper manipulation of the front guide wheel 9 through the manipulation of the rod 12 and its connections. When the tractor is used for plowing and the land or inside traction wheel or guide wheel run in the furrow made by the last plow on a previous trip, the said guide wheel may be set so that it will hug the side of the furrow and will then automatically guide the tractor.

With this improved tractor, the outside or land side traction wheel, being positively driven, does not lag back or produce a back drag on the land side of the tractor, and hence, does not interfere with the guiding action of the front guide wheel, either when running on the road or when used for plowing.

It should also be noted that with the rearwardly projected draw bar 33 integral with or rigidly secured to the tractor frame and with its end terminating, as shown, below the horizontal plane of the axes of the traction wheels, draft strains will produce a downward pressing force on the front guide wheel which will assist in holding the same down upon the ground. This arrangement permits a very light weight being normally thrown upon the said guide wheel. It should further be noted that the said draw bar is located on a line that extends much nearer to the furrow side traction wheel and front guide wheel than it does to the land side traction wheel. This location of the said draw bar prevents too great side thrust on the guide wheel but throws the strain where it will exert some lateral pressure on the guide wheel tending to hold the same against the vertical wall of the furrow, so that it will guide the machine automatically without requiring the said guide wheel to be set at too great an angle in respect to the wall of the furrow.

As is evident, the nut-equipped U-bolts 6 not only connect the bearing bracket or head 5 to the tubular arm 4 with freedom for axial adjustments thereon, but also for rotary adjustments on the axis of said arm. This latter adjustment permits the guide wheel to be set either in a vertical position, or at any inclination or angle, in respect to a vertical position, and by such adjustments, the lower edge of the said guide wheel may be movable laterally and thereby set to cause the alined rear traction wheel 3 to run closer to or farther from the wall of the last furrow formed by a plow on a previous trip.

The tractor frame as herein illustrated consisting of the rear frame or body casting with the tubular arm or reach rigidly connected at its rear end only to said casting is particularly advantageous for a tractor of this general class. The cast metal body portion of the frame forms a rigid support for the motor, the differential gearing and the other parts of the mechanism supported thereon. A frame of this kind is not liable to be racked or twisted as often occurs with frames of structural steel.

The tubular arm or reach, rigidly connected at its rear end only to the body casting of the frame, is also an advantageous feature. It forms a support for the radiator 36 and a convenient connection between the frame casting and the front or guide wheel of the tractor. As this tubular reach or arm is connected to the frame casting at its rear portion only any slight deflection of the arm or reach that may occur will have no tendency to distort or twist the main frame of the tractor, or to interfere with the operation of the mechanism supported on the frame.

I do not limit myself to the details of construction herein illustrated and described as the same may be varied in many particulars without departing from my invention.

What I claim is:

1. In a three wheeled tractor, the combination with a truck frame, of axially alined laterally spaced rear traction wheels, a relatively small front guide wheel alined with one of said traction wheels, a differential gear mechanism connecting said traction wheels, and a motor carried by said truck frame and having connections for driving said traction wheels through said differential gear mechanism.

2. In a three wheeled tractor, the combination with a truck frame, of axially alined laterally spaced rear traction wheels, a relatively small front guide wheel alined with one of said traction wheels, a differential gear mechanism connecting said traction wheels, and a motor carried by said truck frame and having forward and reverse drive gears for driving said traction wheels, both forward and backward, through said differential gear mechanism.

3. In a plow tractor, the combination of a pair of co-axial traction wheels at the sides of the tractor respectively, a single front steering wheel substantially alined longitudinally with one of the traction wheels, said longitudinally alined steering and traction wheels being disposed at the furrow side of the tractor and adapted to travel in the same furrow, a frame supported by said traction and steering wheels, differential gearing between the traction wheels and whereby both will be driven, and a motor mounted on the frame and connected to drive said gearing, said single front wheel when traveling in a furrow acting to automatically steer the tractor, said gearing causing the traction wheels to be driven at relatively different speeds in steering the tractor responsively to the front furrow wheel.

4. In a tractor, the combination of a pair of coaxial traction wheels at the sides of the tractor respectively, a front steering wheel substantially alined longitudinally with one of the traction wheels, said longitudinally alined steering and traction wheels being disposed at the furrow side of the tractor and adapted to travel in the same furrow, a frame supported by said traction and steering wheels, differential gearing between the traction wheels whereby both will be driven, and a motor mounted on the frame and connected to drive said gearing, said steering wheel when traveling in a furrow acting to automatically steer the tractor, said gearing causing the traction wheels to be driven at relatively different speeds in steering the tractor responsively to the front furrow wheel.

5. A tractor, comprising, in combination, a truck frame formed of a body casting and a forwardly projecting arm or reach having its rear end rigidly connected to said body casting, a pair of axially alined laterally spaced rear traction wheels, supporting the rear body portion of said frame, a guide wheel alined with one of said traction wheels, connecting means between the forward portion of said reach and said guide wheel, differential gearing between the traction wheels, whereby both will be driven, and a motor mounted on the frame and connected to drive said gearing, said guide wheel when traveling in a furrow acting to automatically steer the tractor, said gearing causing the traction wheels to be driven at relatively different speeds in steering the tractor responsively to the front furrow wheel.

6. In a tractor, the combination of a pair of coaxial traction wheels at the sides of the tractor respectively, a front steering wheel substantially alined longitudinally with one of the traction wheels, said longitudinally alined steering and traction wheels being disposed at the furrow side of the tractor and adapted to travel in the same furrow, a frame supported by said traction and steering wheels and comprising a body casting and a forwardly projecting tubular arm or reach having its rear end rigidly connected to said body casting, differential gearing between the traction wheels, whereby both will be driven, and a motor mounted on the frame and connected to drive said gearing, said steering wheel when traveling in a furrow acting to automatically steer the tractor, said gearing causing the traction wheels to be driven at relatively different speeds in steering the tractor responsively to the front furrow wheel.

7. A tractor, comprising in combination, a truck frame formed of a body casting and a forwardly projecting tubular arm or reach rigidly connected at its rear portion only with said casting, a pair of coaxial wheels supporting said casting, guiding means supporting the forward portion of said tubular arm or reach, a motor mounted on said frame and transmission mechanism connecting said motor and said traction wheels.

8. A tractor, comprising in combination, a truck frame, formed of a main or body portion, and a forwardly projecting tubular arm or reach rigidly connected at its rear portion only with the body portion of said frame, a pair of traction wheels supporting the body portion of said frame, guiding means supporting the forward end of said tubular arm or reach, differential gearing between the traction wheels, whereby both will be driven, and a motor mounted on the body portion of said frame and connected to drive said gearing.

9. In a tractor, a truck frame, comprising a body casting provided with a forwardly projecting, separately formed but rigidly secured tubular arm, in combination with axially alined laterally spaced rear traction wheels supporting the said body casting, a guide wheel located substantially at the forward end of said tubular arm, means connecting said wheel with said arm, a motor carried on the body of said frame, and transmission mechanism connecting said motor and said traction wheels.

10. A tractor, comprising, in combination, laterally spaced traction wheels, a steering wheel, a frame supported by said traction and steering wheels and formed of a body casting provided with a forwardly projecting, separately formed but rigidly secured tubular arm, a transverse countershaft arranged on said frame, and geared to said traction wheels, and a driving motor mounted on said frame and having a transverse shaft arranged between the axis of said traction wheels and said countershaft.

11. A tractor, comprising, in combination, laterally spaced traction wheels, a steering wheel, a frame supported by said traction and steering wheels, and formed of a body casting provided with a forwardly projecting, separately formed but rigidly secured tubular arm, a transverse divided countershaft mounted on said frame and geared to said traction wheels, and a driving motor mounted on said frame and having a transverse shaft arranged between the axis of said traction wheels and said countershaft.

12. A tractor, comprising, in combination, laterally spaced traction wheels, a frame supported by said traction and steering wheels and formed of a body portion and a forwardly projecting, separately formed but rigidly secured tubular arm, a transverse countershaft arranged on said frame and geared to said traction wheels, and a driving motor mounted on said frame and having a transverse shaft arranged between the axis of said traction wheels and said countershaft.

13. A tractor, comprising, in combination, laterally spaced traction wheels, a steering wheel, substantially alined longitudinally with one of the traction wheels, a frame supported by said traction and steering wheels, and formed of a body portion and a forwardly projecting, separately formed but rigidly secured tubular arm, differential gearing between the traction wheels whereby both will be driven, and a motor mounted on said frame and substantially counterbalanced over the axis of said traction wheels, and connected to drive said differential gearing.

In testimony whereof I affix my signature in presence of two witnesses.

RALPH B. HARTSOUGH.

Witnesses:
HARRY D. KILGORE,
F. D. MERCHANT.